United States Patent [19]

Grady

[11] 4,322,623
[45] Mar. 30, 1982

[54] MOBILE X-RAY APPARATUS

[76] Inventor: John K. Grady, 277 Baker Ave., West Concord, Mass. 01781

[21] Appl. No.: 146,526

[22] Filed: May 5, 1980

[51] Int. Cl.³ .............................................. H05G 1/00
[52] U.S. Cl. .................................................... 250/402
[58] Field of Search ................ 250/402, 422, 408, 421

[56] References Cited

U.S. PATENT DOCUMENTS

| | | | |
|---|---|---|---|
| 2,106,873 | 2/1938 | Marshall | 250/402 |
| 2,717,315 | 9/1955 | Ne Met et al. | 250/402 |
| 2,969,464 | 1/1961 | Chisholm et al. | 250/402 |

Primary Examiner—Bruce C. Anderson
Attorney, Agent, or Firm—James H. Grover

[57] ABSTRACT

A X-ray tube is mounted on the same mobile base as its power supply which includes a pair of motor driven flywheels. The motors can be run from 120 volt outlets to bring the flywheels to a predetermined speed. The motors are then shut off and the flywheels drive electric generators. A motor controlled variac maintains the power output of the generators constant as energy is drawn from the flywheels and they slow down. The power output is switched through a step-up transformer and a rectifier to the load of the X-ray tube. The two flywheels are equal and opposite in angular momentum by counterrotation and therefore cancel the effect precessional or other movement to the mobile base when energy is drawn from them.

8 Claims, 2 Drawing Figures

MOBILE X-RAY APPARATUS

BACKGROUND OF THE INVENTION

In hospitals there is a need for a mobile X-ray unit which can be wheeled to the patient's room. Previous mobile X-ray apparatus has relied on capacitors or storage batteries to provide the high voltage necessary to generate X-rays, because the usual (110 volt) room outlet cannot carry the power to deliver very high voltages (e.g. 125 kilivolts) for short periods (one second or less). Power supplies using capacitors or storage batteries are extremely bulky, heavy, expensive and dangerous and produce a discharge which varies in power and X-ray exposures are inconsistent in density or unduly long in duration.

Thus the objects of the present invention is to provide mobile X-ray apparatus which eliminates heavy capacitors and the like, which can draw low voltage, low power energy from a patient's room outlet and safely and consistently produce the very high voltage required for hospital quality X-rays.

SUMMARY OF THE INVENTION

According to the invention X-ray apparatus comprises a mobile base; an X-ray tube supported on the base; a power supply for the tube including motor means, two flywheels and two electric generators driven by the motor means; and switch means for coupling the generators to the X-ray tube to draw power from the flywheels; wherein the flywheels are mounted on the same mobile base and are counterrotated by the motor means thereby to cancel the effect of their movement when power is drawn from them.

Preferably the power supply comprises motor control means for starting and for shutting off the motor means when the flywheels reach a predetermined speed, and means for regulating the output of the generators responsive to the generator voltage output to maintain the output constant when the motor means is shut off.

DRAWING

DESCRIPTION

Figure 1:
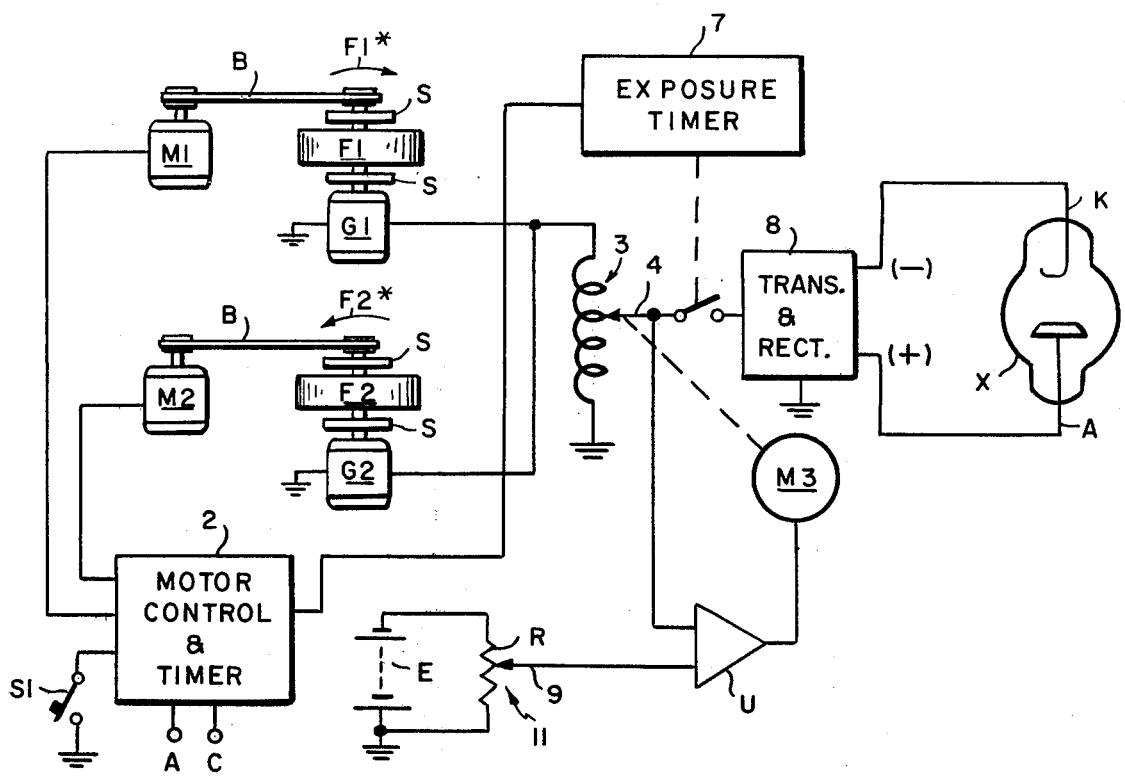
FIG. 1 is a schematic showing of mobile X-ray apparatus.
Figure 2:
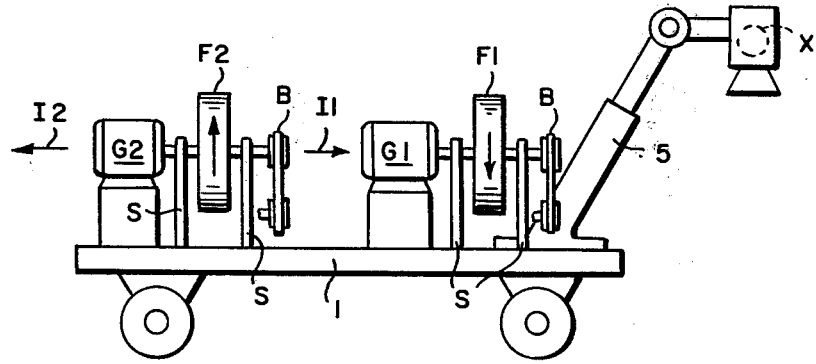
FIG. 2 is an elevation of the apparatus.

As shown in the FIGS. 1 and 2 a portable X-ray apparatus mounted on a wheeled dolly 1 comprises two electric motors M1 and M2. Typically the motors are rated at one half horsepower and are powered from a common 115 volt, 60 cycle alternating current source AC such as is provided in a hospital bedroom. Through belts B the motors drive two flywheels F1 and F2 of about 85 pounds. The flywheels respectively drive alternating current generators G1 and G2 such as high frequency permanent magnet alternators. A motor control and timer 2, when actuated by a manual switch S1 starts the motors so that the flywheels are accelerated (for about 30 seconds to a minute) to 3600 RPM, for example. Power to the motors M1 and M2 may then be shut off if desired and power from the generators is delivered through a variac 3 and a transformer-rectifier 8 to an X-ray tube X supported on an arm 5 on the dolly under the control of an exposure timer 7 controlled by the timer 2. The transformer-rectifier 8 steps the generator voltage from 400 volts in the transformer primary to 65,000 volts in the secondary, for example, and converts the power to direct current at the transformer-rectifier outputs (+) and (−) respectively connected to the anode A and cathode K of the X-ray tube. Although shown as single phase devices for simplicity, the generators, variac and transformer-rectifier 8 are preferably three phase devices oparating in the same way as the single phase devices shown.

The variac 3 may be replaced by a saturable reactor, magnetic amplifier or similar solid state amplifier whose function is to maintain the generator output voltage constant while the flywheels slow down (about 360 RPM) as power is drawn from them. As shown, the variac 3 has a wiper 4 driven by a motor M3. Power for the motor M3 is supplied by an operational amplifier or comparator U having inputs from the variac wiper 4 and a reference voltage source 11 comprising a voltage source E and a potentiometer R having a tap 9. The tap is calibrated and can be manually set to the power desired to be delivered to the X-ray tube. As power is drawn from the generators G1 and G2 and they slow down, the voltage across the variac drops. However, the operational amplifier then senses a difference between the voltage desired and set by the potentiometer R and the voltage at the variac tap 4 and adjusts the tap continuously to maintain the tap voltage, and hence the voltage applied to the X-ray tube, constant at least for the short exposure time.

Because energy is put into the flywheels over a time ($\frac{1}{2}$ to 1 minute) relatively long compared to the time (1 second) power is drawn, the flywheels can deliver very high power (e.g. 15 horsepower) for the period of exposure, a far higher power rate than the 115 volt AC line could supply. The high power is delivered more safely and at a lower capital expense than could be delivered from storage batteries or capacitors, and the power is delivered at a much more constant rate than from capacitors or batteries. The exposure time is shortened and X-ray negatives of consistent, fixed unit hospital quality are obtained from a mobile unit.

Further according to the invention the flywheels F1 and F2 are mounted with standards S on the same mobile base, the dolly 1, as the X-ray tube X and are counterrotated by the motors M1 and M2 as indicated by the arrows F1* and F2* in FIG. 1. As shown in FIG. 2 the flywheels are mounted on the common base with their axes parallel and their rotational movements of inertia I1 and I2 opposed and equal at equal speeds. Consequently when the angular velocity of the flywheels is abruptly decreased by drawing power through the generators the tendency of the flywheels to precess or twist in their mounting standards S is cancelled and no net torque is applied to the dolly and the X-ray tube.

It should be understood that the present disclosure is for the purpose of illustration only and that this invention includes all modifications and equivalents which fall within the scope of the appended claims.

I claim:

1. X-ray apparatus comprising:
   motor means;
   flywheel means driven by the motor means for a relatively long energy storage period;
   electric generator means driven by the flywheel means and having a voltage output;
   an X-ray tube coupled to the generator output to draw power from the flywheel and generator during a relatively short exposure period; and means for regulating the voltage output of the generator means connected to and responsive to the voltage output to maintain the output constant when the flywheel means change speed as power is drawn therefrom.

2. Apparatus according to claim 1 mounted on a mobile base providing a commom support for the X-ray tube and other means of claim 1.

3. Apparatus according to claim 1 wherein two flywheels are mounted on a common mobile base and are counterrotated thereby to cancel the effect of their movement when power is drawn from them.

4. Portable X-ray apparatus comprising:
a mobile base;
an X-ray tube supported on the base;
a power supply for the tube including motor means, two flywheels and two electric generators driven by the motor means; and
switch means for coupling the generators to the X-ray tube to draw power from the flywheels;
wherein the flywheels are mounted on the same mobile base and are counterrotated by the motor means thereby to cancel the effect of their movement when power is drawn from them.

5. Apparatus according to claim 4 wherein the flywheels are coaxial.

6. Apparatus according to claim 4 wherein the moments of inertia of respective flywheels are equal and opposite.

7. Apparatus according to claim 4 including motor control means for starting the motor means and for shutting the motor means off when the flywheels reach a predetermined speed.

8. Apparatus according to claim 1 including switch means for applying the generator output to the tube for a relatively short period of power draining exposure compared to the energy storage period.

* * * * *